(12) United States Patent
Isogai et al.

(10) Patent No.: US 6,270,170 B1
(45) Date of Patent: Aug. 7, 2001

(54) HYDRAULIC ACTUATOR FOR AN ANTI-LOCK BRAKING SYSTEM

(75) Inventors: Kimiyoshi Isogai, Anjyo; Fumitoshi Koyama, Kariya, both of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/298,836

(22) Filed: Apr. 26, 1999

(30) Foreign Application Priority Data

Apr. 24, 1998 (JP) .................................................. 10-115422
Apr. 9, 1999 (JP) .................................................. 11-102813

(51) Int. Cl.⁷ ...................................................... B60T 8/36
(52) U.S. Cl. .................. 303/119.3; 303/87; 303/DIG. 10
(58) Field of Search ............................... 303/DIG. 10, 87, 303/119.3; 137/887; 417/540

(56) References Cited

U.S. PATENT DOCUMENTS

| 5,035,469 | * | 7/1991 | Geilen et al. ........................... 303/87 |
| 5,236,253 | * | 8/1993 | Glasmacher ............................ 303/87 |
| 5,244,262 | | 9/1993 | Kehl et al. .......................... 303/119.2 |
| 5,466,055 | | 11/1995 | Schmitt et al. ..................... 303/119.2 |
| 5,658,056 | | 8/1997 | Rischen et al. ..................... 303/119.2 |
| 5,967,623 | * | 10/1999 | Agnew .................................... 303/87 |
| 5,975,652 | * | 11/1999 | Otto .............................. 303/DIG. 10 |

FOREIGN PATENT DOCUMENTS

| 4-506788 | 11/1992 | (JP) . |
| 5-058260 | * 3/1993 | (JP) . |
| 7-500068 | 1/1995 | (JP) . |
| 8-080827 | 3/1996 | (JP) . |

* cited by examiner

Primary Examiner—Robert J. Oberleitner
Assistant Examiner—Robert A. Siconolfi
(74) Attorney, Agent, or Firm—Pillsbury Winthrop LLP

(57) ABSTRACT

A motor, installed on a first surface of a housing, has a drive shaft normal to the first surface. Two pumps are installed in the housing and driven by the motor for introducing and discharging operation fluid. Two reservoirs are provided in the housing for storing the operation fluid released from a wheel cylinder and supplied to the pump. Each reservoir has an opening at a second surface of the housing and an axis normal to the second surface. Two dampers are provided in the housing for suppressing pulsation flow of the operation fluid discharged from the pump. Each damper has an opening at a third surface of the housing and an axis normal to the third surface. The third surface faces to the second surface so that the drive shaft of the motor is interposed between the second surface and the third surface.

26 Claims, 7 Drawing Sheets

HYDRAULIC ACTUATOR FOR AN ANTI-LOCK BRAKING SYSTEM

BACKGROUND OF THE INVENTION

The present invention relates to a hydraulic actuator preferably used for controlling braking fluid of an anti-lock braking system installed in an automotive vehicle.

In the anti-lock braking system, the hydraulic actuator increases or decreases the hydraulic pressure of each wheel cylinder to prevent the wheel from locking during the braking operation.

FIG. 6 shows a conventional hydraulic actuator disclosed in the U.S. Pat. No. 5,244,262. This actuator comprises two reservoirs 101 and 102 each storing the braking fluid released from a wheel cylinder. Four pressurizing control valves 103, 106, 107 and 110 are used for controlling the connection and disconnection between the master cylinder and wheel cylinders. Four depressurizing control valves 104, 105, 108 and 109 are used for controlling the connection and disconnection between the wheel cylinder and the reservoirs 101 and 102. Two plunger pumps 111 and 112 supply the braking fluid to the master cylinder from the reservoirs 101 and 102, respectively. Two dampers 113 and 114 suppress the pulsation flow of the braking fluid supplied from the pumps 113 and 114.

The reservoirs 101 and 102, the pressurizing control valves 103, 106, 107 and 110, the depressurizing control valves 104, 105, 108 and 109, the plunger pumps 111 and 112, and the dampers 113 and 114 are integrally assembled in a housing 115.

According to this conventional hydraulic actuator, all of the pressurizing control valves 103, 106, 107 and 110 and all of the depressurizing control valves 104, 105, 108 and 109 are disposed at a same side with respect to an axial line 116 of the plungers 111 and 112. The reservoirs 101 and 102 and the dampers 113 and 114 are disposed along a line at the other side with respect to the axial line 116. This arrangement makes it possible to effectively utilize an available space to a certain degree.

However, a width size of the housing 115 is substantially restricted by the four sequential elements, i.e., reservoirs 101 and 102 and dampers 113 and 114, arrayed in a line.

FIGS. 7A and 7B show an improved hydraulic actuator proposed in the U.S. Pat. No. 5,658,056. According to this conventional hydraulic actuator, two reservoirs 121 and 122 are disposed in parallel with two dampers 123 and 124 so that their axes are positioned at four corners of a rectangle. This arrangement is advantageous in reducing the width size of an actuator housing 125.

SUMMARY OF THE INVENTION

An object of the present invention is to further improve the arrangement of the hydraulic actuator so as to optimize the volumetric efficiency of the actuator housing.

In order to accomplish this and other related objects, one aspect of the present invention provides a hydraulic actuator used in a hydraulically operable system, such as an anti-lock braking system, which is preferably installed in an automotive vehicle. The hydraulic actuator of the present invention comprises a housing. A motor is installed on a first surface of the housing and has a drive shaft normal to the first surface. At least one pump is installed in the housing and driven by the motor for introducing and discharging operation fluid. Two reservoirs are provided in the housing for storing the operation fluid released from a hydraulically operable element, such as a wheel cylinder. Each reservoir has an opening at a second surface of the housing and an axis normal to the second surface. The second surface is different from the first surface on which the motor is disposed. Two dampers are provided in the housing for suppressing pulsation flow of the operation fluid discharged from the pump. Each damper has an opening at a third surface of the housing and an axis normal to the third surface. The third surface is different from the second surface. The third surface is spaced from and faces to the second surface so that the drive shaft of the motor is interposed between the second surface and the third surface.

According to this arrangement, the two dampers are located in an opposed relationship with the two reservoirs with the drive shaft interposed between the dampers and the reservoirs. With this arrangement, it is not necessary to array the reservoirs and the dampers in a line. Thus, it becomes possible to downsize the hydraulic actuator.

Another aspect of the present invention provides a hydraulic actuator comprising a hexahedral housing including first to third surfaces. Each of the two reservoirs has an opening at the second surface of the hexahedral housing and an axis normal to the second surface. The second surface is located next to the first surface. Each of the two dampers has an opening at the third surface of the hexahedral housing and an axis normal to the third surface. The third surface is in an opposed relationship with the second surface.

Another aspect of the present invention provides a hydraulic actuator comprising a housing with first to third surfaces, wherein the second surface with the openings for the two reservoirs is parallel to the third surface with the openings for the two dampers.

According to preferred embodiments, one of the two reservoirs is overlapped with one of the two dampers and the other of the two reservoirs is overlapped with the other of the two dampers when the two reservoirs and the two dampers are seen from a direction normal to the second surface.

Preferably, a distance between axes of the reservoir and the damper which are overlapped each other is shorter than a smaller one of a reservoir diameter and a damper diameter.

Preferably, the axis of the reservoir coincides with the axis of the damper when they are overlapped each other in the direction normal to the second surface.

According to preferred embodiments of the present invention, the housing has a fourth surface facing to the first surface on which the motor is disposed to drive the pump. A plurality of control valves are provided at the fourth surface for controlling the flow of the operation fluid.

When a total of eight control valves are provided, these control valves are arranged in a 2×4 pattern along two lines parallel to the third surface. All of the eight control valves are located at the same side adjacent to the dampers with respect to the drive shaft.

Another aspect of the present invention provides a hydraulic actuator comprising a housing with first to fourth surfaces. The two reservoirs are provided in the housing. Each reservoir has an opening at the second surface of and an axis normal to the second surface. The second surface is different from the first surface on which the motor is disposed for driving the pump. The two dampers are provided in the housing. Each damper has an opening at a third surface of the housing and an axis normal to the third surface. The third surface is different from the second surface. A plurality of control valves are provided at the fourth facing to the first surface. The third surface faces to the second surface so that the drive shaft of the motor is interposed between the two reservoirs and the two dampers. The plurality of control valves are located at the same side adjacent to the dampers with respect to the drive shaft and the pump.

According to the preferred embodiments of the present invention, each damper has a damper chamber recessed from the third surface of the housing and extending in the housing in a direction normal to the third surface. Each reservoir has a reservoir chamber recessed from the second surface of the housing and extending in the housing in a direction normal to the second surface. An axial length of the damper chamber is longer than an axial length of the reservoir chamber.

Another aspect of the present invention provides a hydraulic actuator comprising a hexahedral housing. The motor is installed on a surface of the housing for driving the piston pump. The piston pump reciprocates to perform a predetermined pumping operation. Each of the two reservoirs is disposed in a reservoir hole extending in a direction normal to the piston pump. Each of the two dampers is disposed in a damper hole provided in an opposed relationship with the reservoir hole with respect to the piston pump. A plurality of electromagnetic valves are provided in the housing. The electromagnetic valves are disposed in valve holes recessed from a surface of the housing opposed to the surface on which the motor is installed. All of the electromagnetic valves are located at the same side adjacent to the damper holes with respect to the piston pump. At least part of the electromagnetic valves is overlapped with the damper holes when the electromagnetic valves and the dampers are seen from the axial direction of the electromagnetic valves.

According to the preferred embodiments of the present invention, the damper holes are smaller in diameter than the reservoir holes. Part of a pipe line extending from the electromagnetic valves is interposed between the damper holes and the valve holes of the electromagnetic valves.

Another aspect of the present invention provides a hydraulic actuator comprising a hexahedral housing wherein a reference plane is defined by a shifting direction of the piston pump and the drive shaft of the motor. The two reservoirs are disposed in reservoir holes provided at the same side with respect to the reference plane. The two dampers are disposed in damper holes provided at the other side with respect to the reference plane. A plurality of electromagnetic valves are disposed in valve holes provided at the same side as the dampers with respect to the reference plane.

BRIEF DESCRIPTION OF THE DRAWINGS

The above and other objects, features and advantages of the present invention will become more apparent from the following detailed description which is to be read in conjunction with the accompanying drawings, in which.

DESCRIPTION OF THE PREFERRED EMBODIMENTS

Figure 1:
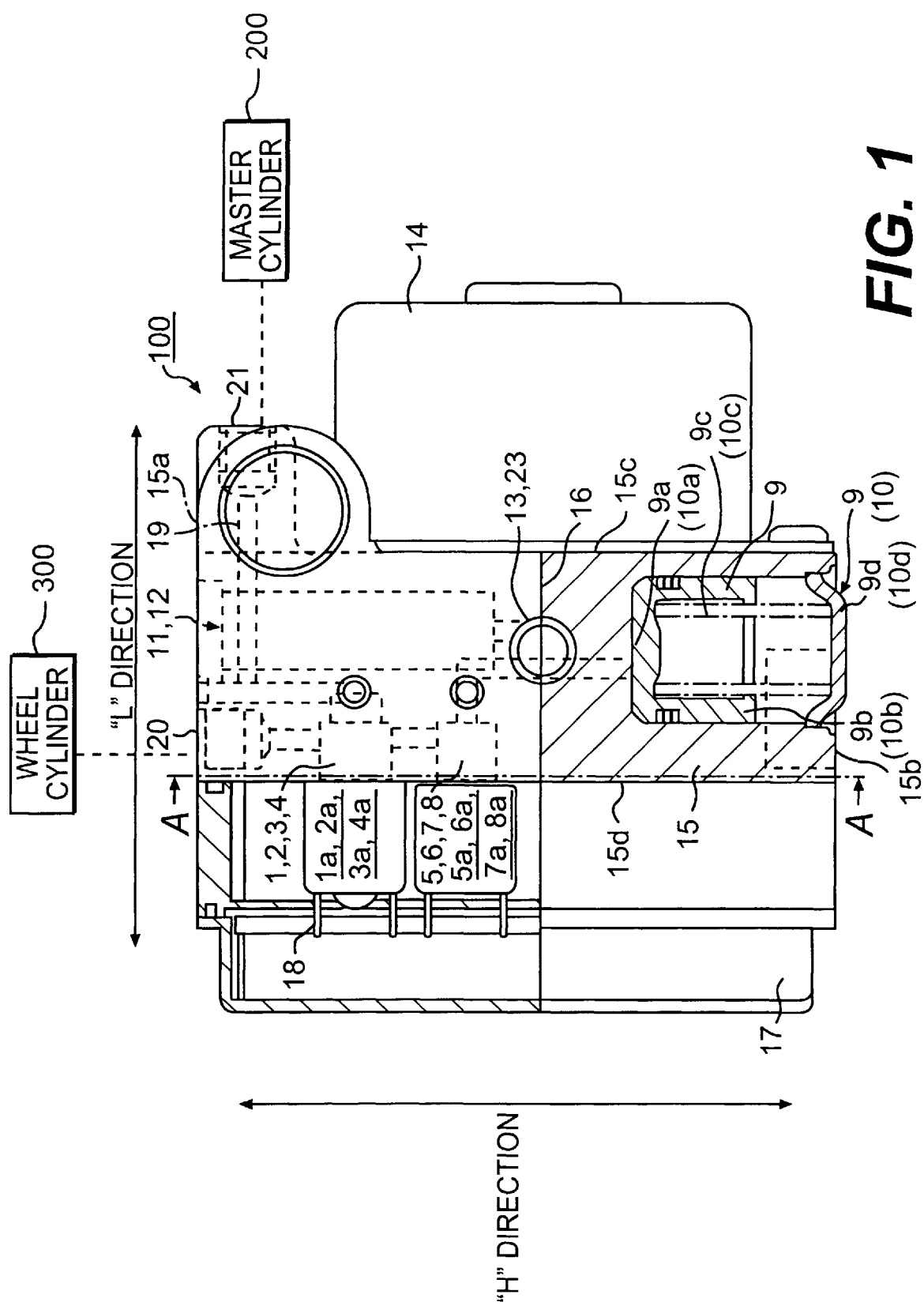
FIG. 1 is a partially sectional view showing an actuator for an anti-lock braking system in accordance with a preferred embodiment of the present invention.

Preferred embodiments of the present invention will be explained hereinafter with reference to attached drawings. Identical parts are denoted by the same reference numerals throughout the views.

Figure 2:
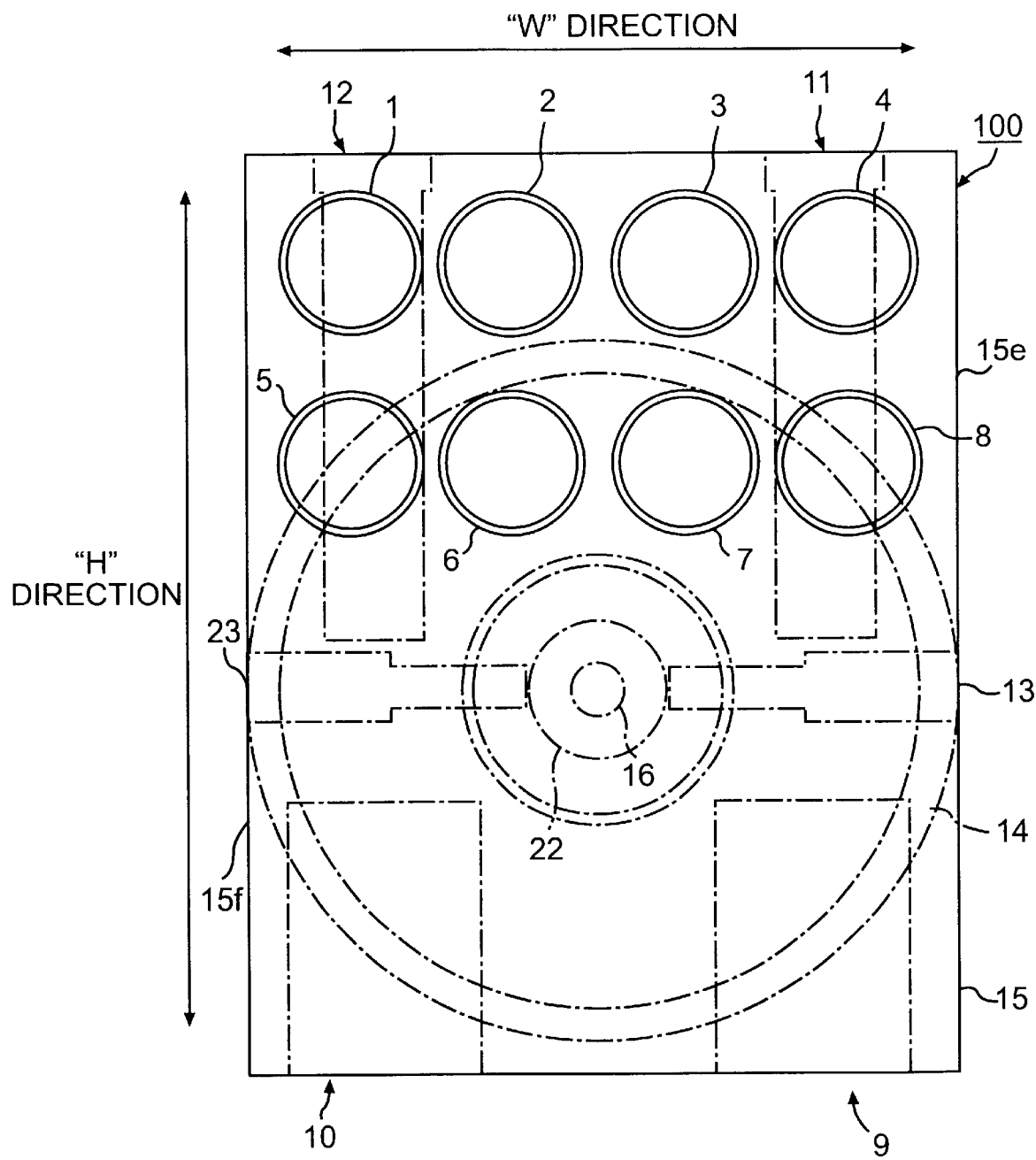
FIG. 2 is a cross-sectional view showing the actuator in accordance with the preferred embodiment of the present invention, taken along a line A—A of FIG. 1.
Figure 3:
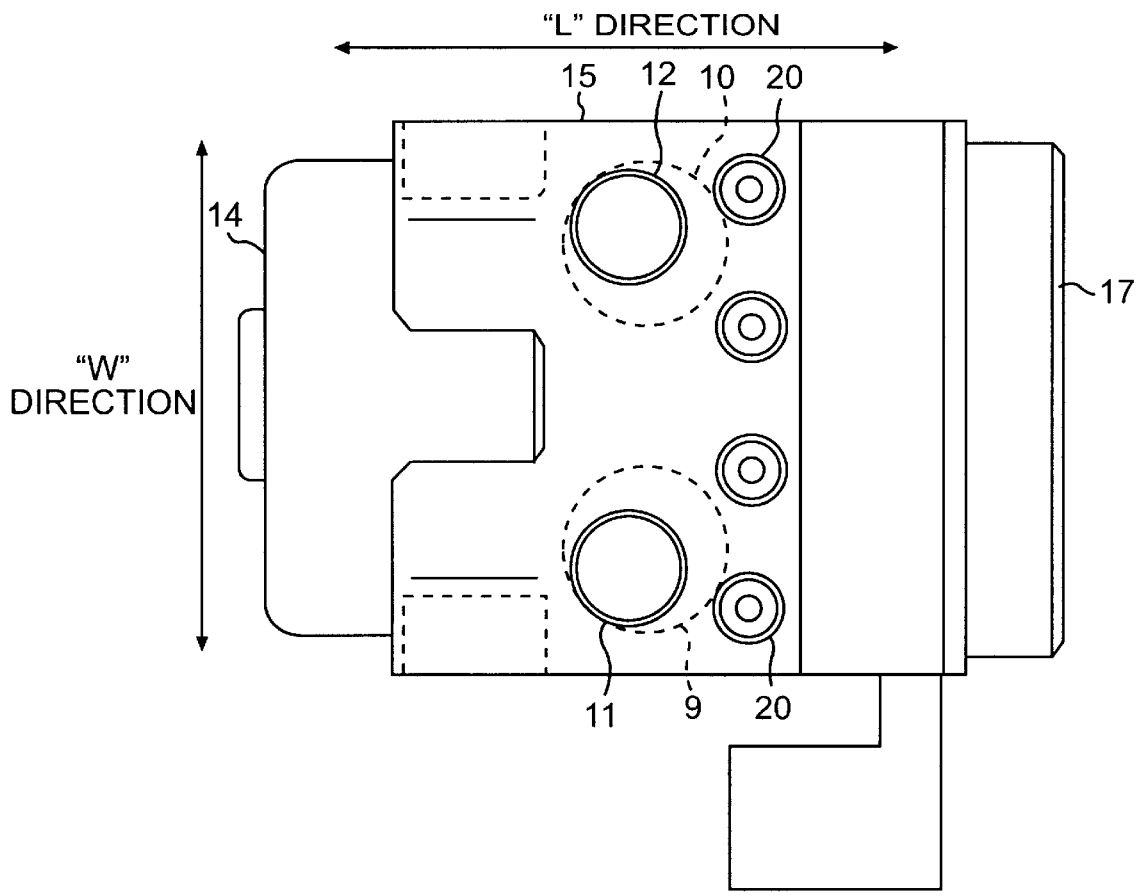
FIG. 3 is a plan view showing the actuator in accordance with the preferred embodiment of the present invention.

FIGS. 1 to 3 show an actuator 100 for an anti-lock braking system (abbreviated ABS actuator hereinafter) in accordance with a preferred embodiment of the present invention. The ABS actuator 100 is installed between a master cylinder 200 and a wheel cylinder 300 in an automotive braking system. The ABS actuator 100 is used to prevent the wheel from locking during the braking operation. In FIGS. 1 and 2, the "H" direction of the ABS actuator 100 is identical with an up-and-down direction of the automotive vehicle.

As apparent from FIGS. 1 to 3, the ABS actuator 100 comprises a plurality of control valves 1 to 8, two reservoirs 9 and 10, two dampers 11 and 12, two plunger pumps 13 and 23, and a motor 14 driving the plunger pumps 13 and 23. The members 1–14 and 23 are integrally assembled in a housing 15.

The housing 15 has a hexahedral body with a top surface 15a positioned at an upper level in FIG. 1, a bottom surface 15b positioned at a lower level in FIG. 1, and four side surfaces.

The motor 14 is installed on a first side surface 15c of this housing 15. The motor 14 has a drive shaft 16 (refer to FIG. 2) extending in a direction normal to the first side surface 15c. The control valves 1 to 8 are provided at a second side surface 15d of the housing 15 which faces to the first side surface 15b in an opposed relationship.

The control valves 1 to 8 are disposed in an upper region of the second side surface 15d higher than the drive shaft 16. In other words, all of the control valves 1 to 8 are located at the same side with respect to the drive shaft 16. Although not shown in the drawing, a bus bar is disposed in a lower region of the second side surface 15d lower than the drive shaft 16. The bus bar serves as a lead or wiring for electrically connecting solenoids 1a to 8a of the control valves 1 to 8 and the motor 14 to a driving power source.

A cover 17, provided on the second side surface 15d of the housing 15, serves as a protector for preventing all of the solenoids 1a to 8a of the control valves 1 to 8, connecting terminals 18 and the bus bar from being subjected to water.

The plunger pumps 13 and 23 are provided at third and fourth side surfaces 15e and 15f of the housing 15, respectively. The third side surface 15e and the fourth side surface 15f are opposed each other and located between the first side surface 15c and the second side surface 15d which are also opposed each other.

Each of the plunger pumps 13 and 23 extends in a direction parallel to the first side surface 15c (on which the motor 14 is disposed) and normal to the third and fourth side surfaces 15e and 15f (i.e., normal to axes of the reservoirs 9 and 10 and the dampers 11 and 12).

The plunger pumps 13 and 23, each extending in a direction normal to the drive shaft 16 of the motor 14, reciprocate in the direction normal to the drive shaft 16 to introduce or discharge the braking fluid.

The reservoirs 9 and 10 are provided in the housing 15 for storing the braking fluid released from the wheel cylinder 300 and then supplied to the plunger pumps 13 and 23.

The reservoirs 9 and 10 have openings at the bottom surface 15*b* of the housing 15 and axes extending in a direction normal to the bottom surface 15*b*. The dampers 11 and 12 are provided in the housing 15 for suppressing pulsation flow of the braking fluid discharged from the plunger pumps 13 and 23. The dampers 11 and 12 have openings at the top surface 15*a* of the housing 15 and axes extending in a direction normal to the top surface 15*a*. The reservoirs 9 and 10 and the dampers 11 and 12 are symmetrically arranged with respect to the drive shaft 16 of the motor 14.

The reservoirs 9 and 10 and the dampers 11 and 12 are required to have the same capacity when the ABS actuator 100 is used for the anti-lock braking system only. According to the embodiment shown in FIGS. 1 to 3, the diameter of the reservoirs 9 and 10 is larger than that of the dampers 11 and 12. The axial length (i.e., the size in the "H" direction) of the dampers 11 and 12 is longer than that of the reservoirs 9 and 10.

The above-described arrangement of the hexahedral housing 15 will be explained in more detail hereinafter. In FIG. 1, the "H" direction is defined as an up-and-down direction, the "L" direction is defined as a right-and-left direction, and the "W" direction is defined as a normal direction perpendicular to both of the "H" and "L" directions.

The axes of the reservoirs 9 and 10 and the dampers 11 and 12 extend in the "H" direction. The drive shaft 16 of the motor 14 extends in the "L" direction.

A reference plane is defined as an L-W plane comprising the drive shaft 16 of the motor 14 and the plunger pumps 13 and 23. The reservoirs 9 and 10 and the plunger pumps 13 and 23 are located in an opposed relationship with respect to this reference plane.

The housing 15 has a plurality of pipe lines 19 which connect the components of the ABS actuator 100 to form a hydraulic circuit. The dampers 11 and 12 are disposed in damper holes. The electromagnetic valves 1 to 8 are disposed in valve holes. At least part of the pipe lines 19 is located between the damper holes of the dampers 11 and 12 and the valve holes of the electromagnetic valves 1 to 8. This arrangement is realized by setting the diameter of the damper holes smaller than that of the holes of the reservoirs 9 and 10.

A pipe extending from each wheel cylinder 300 is connected to an opening 20 provided at the top surface 15*a* of the housing 15. A pipe extending from the master cylinder 200 is connected to an opening 21 provided at the first side surface 15*c* of the housing 15. Alternatively, the opening 21 can be provided at the top surface 15*a* and the openings 20 can be provided at any side surface of the housing 15.

The housing 15, when seen from the "L" direction as shown in FIG. 2, substantially defines an outer configuration of the ABS actuator 100. A cam 22 is provided at a center of the housing 15. The drive shaft 16 of the motor 14 drives the cam 22. The cam 22 rotates eccentrically in response to the rotation of the drive shaft 16. The plunger pumps 13 and 23 are disposed at both sides of the cam 22. Each plunger of the plunger pumps 13 and 23 is driven by the cam 22 so as to reciprocate in accordance with the eccentric rotation of the cam 22.

The control valves 1 to 8, arranged in a 2×4 pattern consisting of two lines extending in the "W" direction, are disposed in an upper region of the second side surface 15*d* of the housing 15. The control valves 1 to 4, arrayed along an upper line, are pressurizing control valves for controlling the connection and disconnection between the master cylinder 200 and the wheel cylinders 300. The control valves 5 to 8, arrayed along a lower line, are depressurizing control valves for controlling the connection and disconnection between the wheel cylinders 300 and the reservoirs 9 and 10. As apparent from FIG. 2, at least part of the control valves 1, 4, 5 and 8 are overlapped with the dampers 11 and 12 when they are seen from the axial direction of the control valves (i.e., seen from the "L" direction).

As shown in FIG. 1, the reservoir 9 (10) has a cylindrical reservoir chamber 9*a* (10*a*) formed as a recessed portion which extends perpendicularly from the bottom surface 15*b* of the housing 15. A reservoir piston 9*b* (10*b*) is coupled in the reservoir chamber 9*a* (10*a*). A spring 9*c* (10*c*) is accommodated in the reservoir chamber 9*a* (10*a*) for resiliently urging the reservoir piston 9*b* (10*b*). A circular cover 9*d* (10*d*) is engaged with the opening of the housing 15 by caulking. The spring 9*c* (10*c*) is securely held by the cover 9*d* (10*d*). The reservoir piston 9*b* (10*b*) is slidable in the axial direction (i.e., depth direction) of the reservoir chamber 9*a* (10*a*).

The damper 11(12) is formed as a cylindrical hole formed as a recessed portion which extends perpendicularly from the top surface 15*a* of the housing 15. The dampers 11 and 12 suppress pulsation flow of the braking fluid discharged from the plunger pumps 13 and 23, respectively.

The total number of the reservoirs 9 and 10 is identical with that of the dampers 11 and 12, and is determined according to the piping arrangement of an actual braking system. According to the embodiment of FIGS. 1 to 3, two reservoirs 9 and 10 and two dampers 11 and 12 are provided for two independent piping groups.

As shown in FIG. 3, one reservoir 9 is overlapped with one damper 11 and the other reservoir 10 is overlapped with the other damper 12 when they are seen in the "H" direction from the top of the ABS actuator 100.

More specifically, it is desirable that the opposed damper and reservoir are overlapped each other. To this end, the axis of the cylindrical damper 11 is located within the cylindrical cross section of the corresponding reservoir 9. Similarly, the axis of the cylindrical damper 12 is located within the cylindrical cross section of the corresponding reservoir 10. In this manner, overlapping the radial cross section of the reservoir 9 (10) with the radial cross section of the corresponding damper 11 (12) is effective to downsize the ABS actuator 100 in the "L" direction. Needless to say, a large amount of downsizing of the ABS actuator 100 is realized by increasing the overlap amount between the corresponding damper and reservoir.

As shown in FIG. 3, the reservoirs 9 and 10 are arrayed in the "W" direction in parallel with the dampers 11 and 12. This arrangement makes it possible to reduce the total number of the actuator components arrayed in a line at each of the top surface 15*a* and the bottom surface 15*b* of the housing 15. Only two actuator components (i.e., dampers 11 and 12) are provided at the top side (i.e., top surface 15*a*) of the housing 15. Only two actuator components (i.e., reservoirs 9 and 10) are provided at the bottom side (i.e., bottom surface 15*b*) of the housing 15.

It may be impossible to reduce the "H" directional size of the ABS actuator 100 because the "H" directional size is substantially restricted by a sum of the axial length of the reservoir 9 (10) and the axial length of the damper 11 (12).

However, the "H" directional size of the ABS actuator 100, restricted by the total axial length of the reservoir 9 (10) and the damper 11 (12), may be appropriate when the control valves 1 to 8 need to be disposed somewhere in the housing 15.

The reason why the diameter of the reservoir 9 (10) is set to be larger than the diameter of the damper 11 (12) is as follows.

As described above, the damper 11 (12) acts as a means for suppressing the pulsation flow of the braking fluid discharged from the plunger pump. For realizing this function, the structure required for the damper 11 (12) is a simple hole or bore opened in the housing 15 can be closed by a lid or cap. On the other hand, the reservoir 9 (10) requires mechanical parts (9b–9d or 10b–10d) for storing the braking fluid for depressurizing the wheel cylinders 300 and for discharging the braking fluid to the master cylinder 200. To dispose these mechanical parts in the reservoir chamber 9a (10a), the reservoir 9 (10) has a larger diameter compared with the damper 11 (12).

As explained in the foregoing description, the reservoir piston 9b (10b) is slidably coupled in the reservoir chamber 9a (10a) to discharge the braking fluid. It is therefore essentially important to assure the slide movement of the reservoir piston 9b (10b) along the cylindrical wall of the reservoir chamber 9a (10a). To this end, it is effective to increase the diameter of the reservoir chamber 9a (10a). The sliding distance of the reservoir piston 9b (10b) is substantially determined by the required amount of the braking fluid. When the reservoir chamber 9a (10a) has a smaller diameter, the required sliding distance of the reservoir piston 9b (10b) must be increased to compensate the reduced capacity per unit stroke of the reservoir piston 9b (10b). The reservoir piston 9b (10b) has a tendency of causing large oscillation during a long sliding movement. The sliding movement of the reservoir piston 9b (10b) is worsened.

On the other hand, the diameter of the damper 11 (12) can be reduced to a certain degree as far as the braking fluid is temporarily stored for suppressing the pulsation flow of the braking fluid. The damper 11 (12) is not limited to a particular shape and is not restricted in diameter to a predetermined length. Accordingly, the damper 11 (12) can be formed into an elongated shape having a smaller diameter. This is why the reservoir 9 (10) has a diameter larger than that of the damper 11 (12).

The above-described ABS actuator 100 acts to release the braking fluid from the wheel cylinders 300 to the reservoirs 9 and 10 in response to an actuation signal for preventing the wheel from locking during a braking operation. The braking fluid is introduced from the reservoirs 9 and 10 to the plunger pumps 13 and 23. The plunger pumps 13 and 23 discharge the braking fluid to the dampers 11 and 12. The pulsation flow of the braking fluid is suppressed by the dampers 11 and 12. The braking fluid is then returned to the master cylinder 200.

As the reservoirs 9 and 10 and the dampers 11 and 12 are symmetrically arranged with respect to the drive shaft 16 of the motor 14, the balanced stress of the braking fluid is uniformly loaded about the drive shaft 16 of the motor 14.

In this manner, disposing the reservoirs 9 and 10 in an opposed relationship with the dampers 11 and 12 is effective to improve the volumetric ratio of the actuator components 9 to 12 to the housing 15. Thus, it becomes possible to downsize the ABS actuator 100.

According to the embodiment shown in FIGS. 1 to 3, as described above, the diameter of the dampers 11 and 12 is smaller than the diameter of the reservoirs 9 and 10. In other words, an available space for other components can be increased in the vicinity of the dampers 11 and 12. Thus, the increased space of the housing 15 is effectively used for installing the control valves 1 to 8 extending in the "L" direction. In other words, the present invention can improve the volumetric efficiency of the housing 15.

Figure 4:
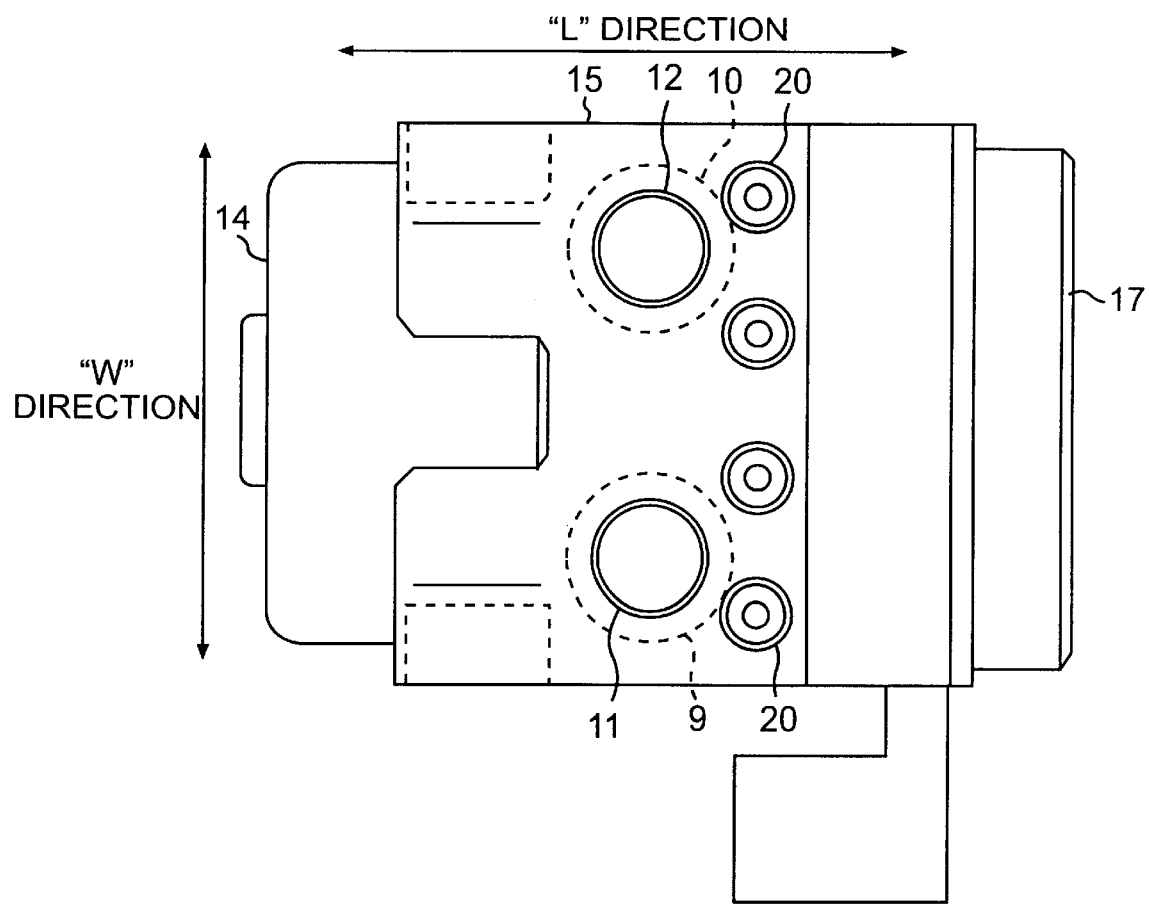
FIG. 4 is a plan view showing another actuator in accordance with the preferred embodiment of the present invention.

FIG. 4 shows another arrangement in accordance with the present invention. According to this arrangement, the axes of the reservoirs 9 and 10 coincide with the axes of the dampers 11 and 12, respectively. It is preferable that a distance between axes of the reservoir and the damper which are overlapped each other is shorter than a smaller one of a reservoir diameter and a damper diameter.

The present invention is not limited to the above-described ABS actuators, and can be applied to any advanced or multi-functional actuator which may be preferably used for a traction control of the vehicle or for a side slip control of each wheel. In other words, the present invention can be applied to any other actuators capable of functioning as an ABS actuator.

Figure 5:
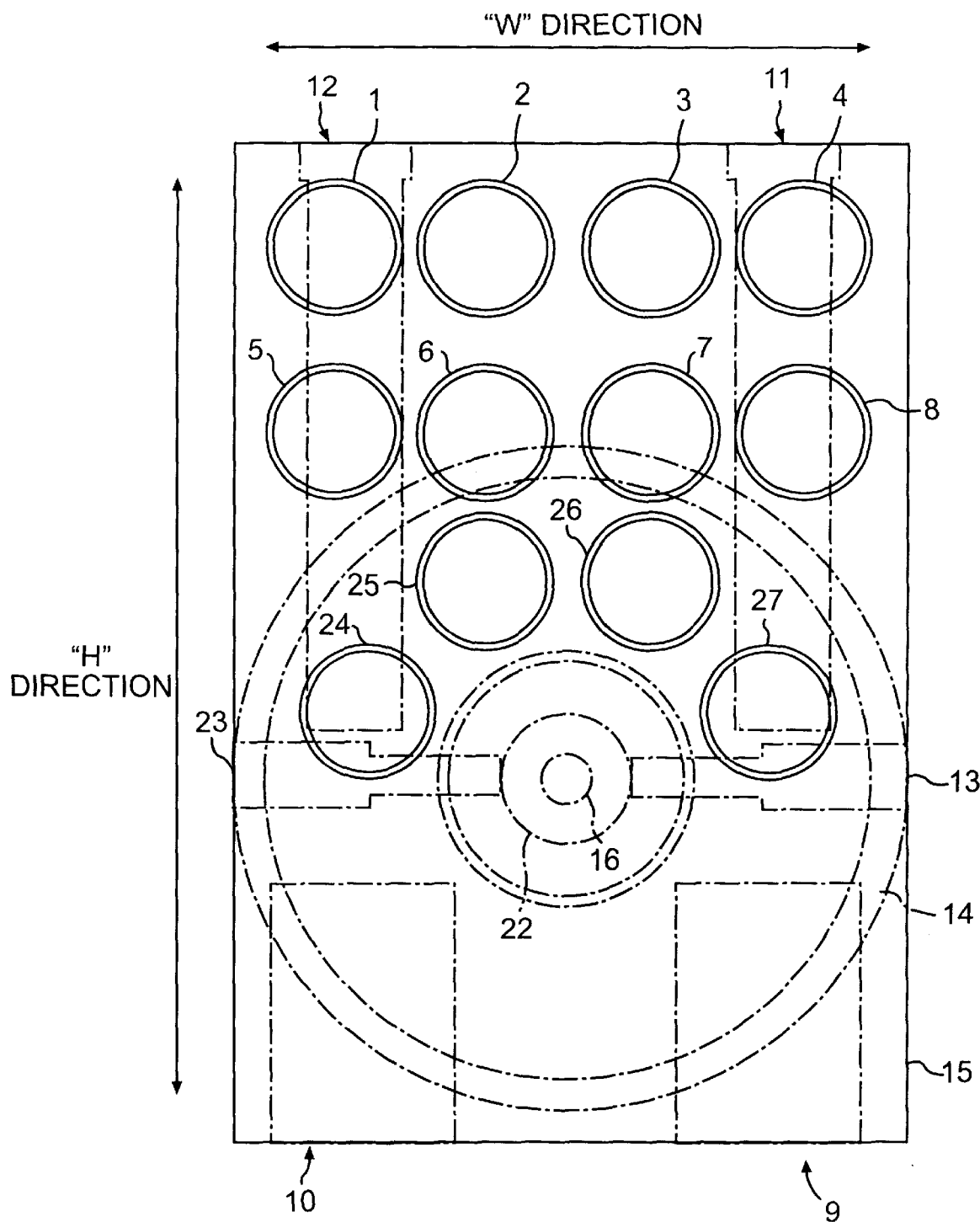
FIG. 5 is a cross-sectional view showing another actuator in accordance with the preferred embodiment of the present invention.
Figure 6:
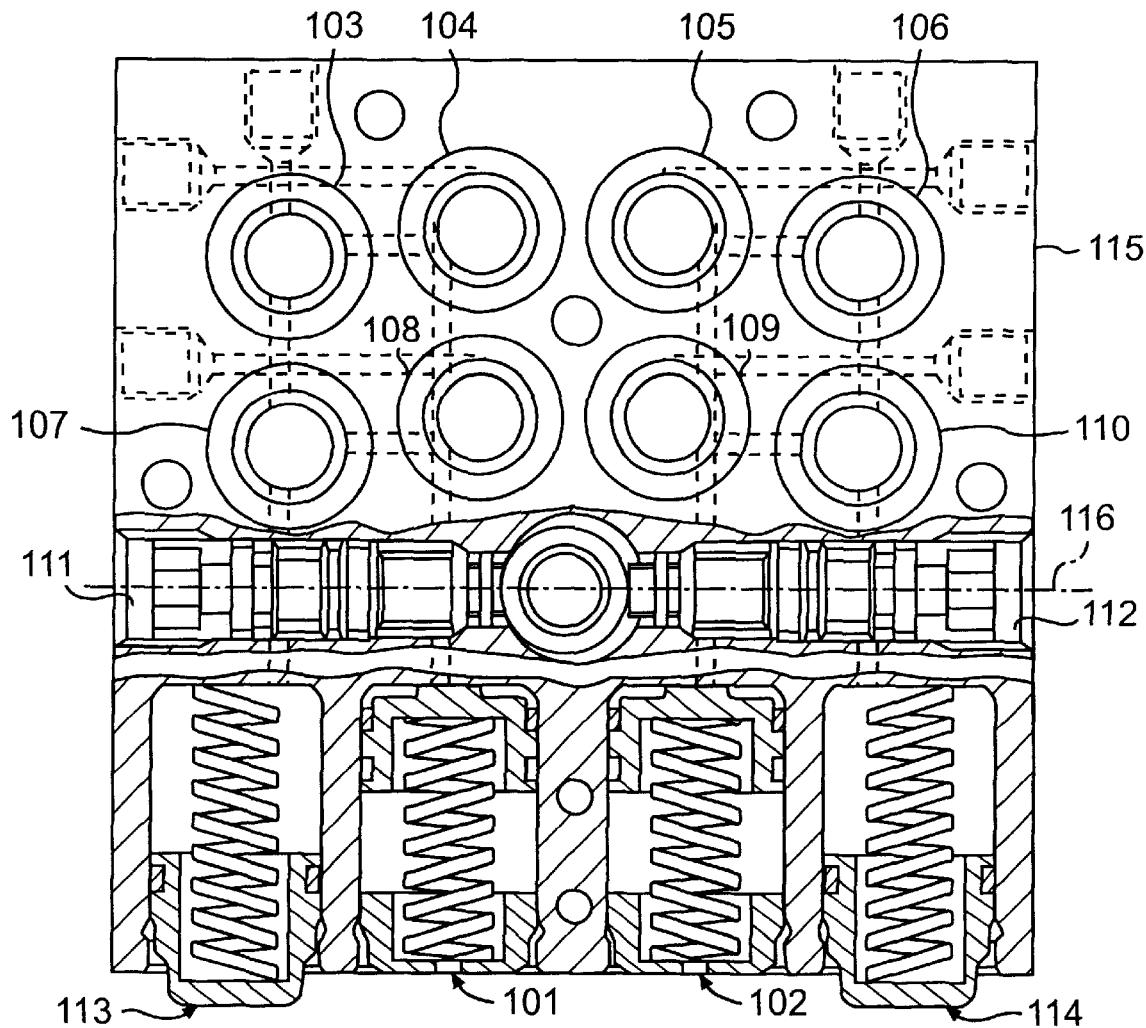
FIG. 6 is a partially sectional view showing a conventional actuator of an anti-lock braking system disclosed in the U.S. Pat. No. 5,244,262.
Figure 7B:
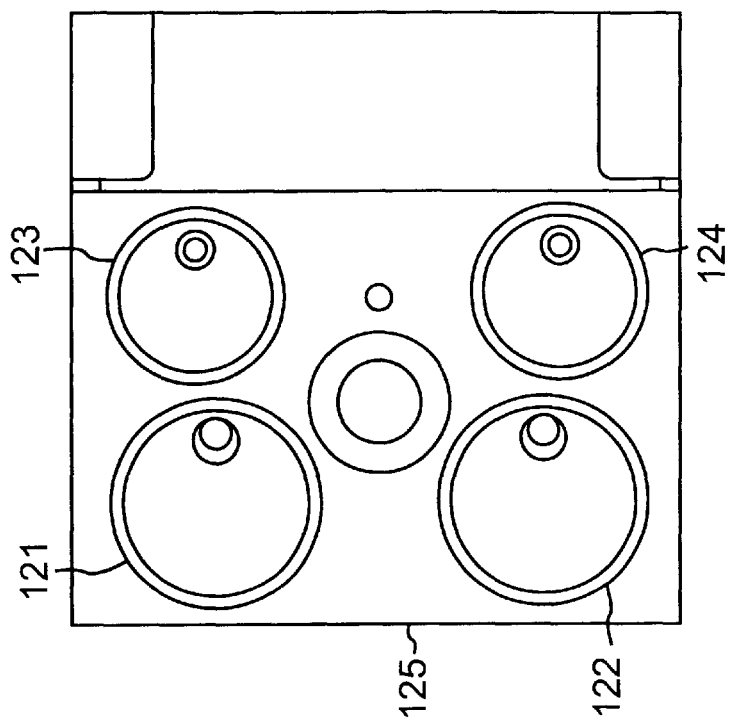
FIGS. 7A is a cross-sectional view and FIG. 7B is a bottom view cooperatiely showing another conventional actuator of an anti-lock braking system disclosed in the U.S. Pat. No. 5,658,056.
Figure 7A:
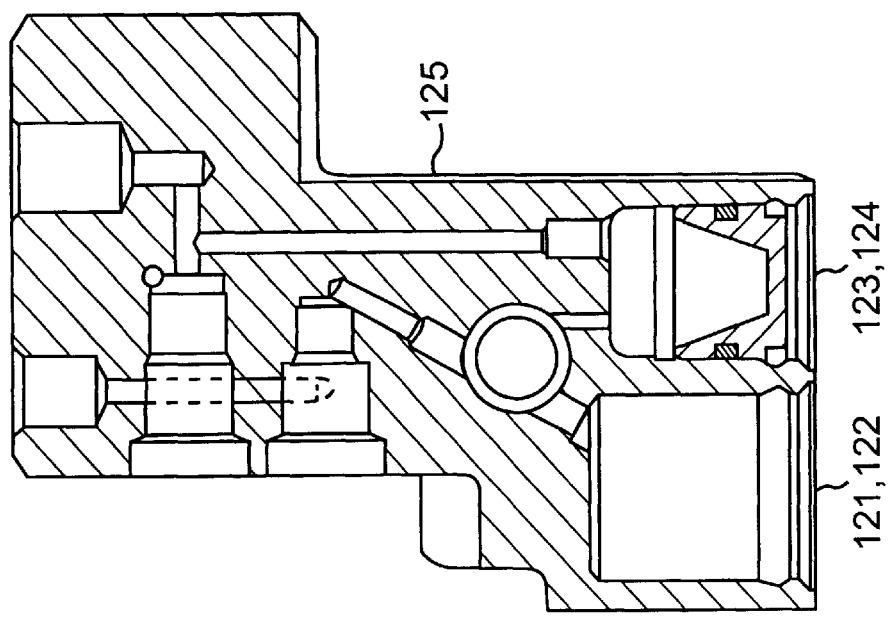

FIG. 5 shows a practical arrangement of the advanced or multi-functional actuator in accordance with the present invention. According to this arrangement, four control valves 24 to 27 are provided in addition to the control valves 1 to 8 disclosed in the arrangement of the ABS actuator shown in FIG. 2. The additional control valves 24 to 27 are located at an altitudinal zone lower than the control valves 1 to 8. The control valves 24 and 27 disconnect the passages between the master cylinder 200 and the wheel cylinders 300 during the predetermined traction control or the side slip control. The control valves 24 and 26 control the braking fluid supplied from the master cylinder 200 to the plunger pumps 13 and 23.

According to the arrangement shown in FIG. 5, the control valves 25 and 26 are located at a higher level and the control valves 24 and 27 are located at a lower level. However, the arrangement of respective control valves 25 to 27 can be modified flexibly. For example, it is possible to locate the control valves 24 and 27 at the higher level and locate the control valves 25 and 26 at the lower level.

For realizing the predetermined traction control or the side slip control, each of the dampers 11 and 12 disclosed in FIG. 5 has an enlarged volume compared with those disclosed in FIG. 2.

It is possible to exchange the position of some of the electromagnetic valves 1 to 8 with the position of the control valves 24 and 25.

In any case, all of the electromagnetic valves 1 to 8 and the control valves 25 to 27 are located at the same side adjacent to the dampers 11 and 12 in the "H" direction with respect to the reference plane defined by the drive shaft 16 of the motor 14 and the plunger pumps 13 and 23.

The present invention is applicable to actuators having rotary type pumps, such as trochoid pumps, in the same manner as the above-described actuator having the plunger-type pumps. In this case, the trochoid pumps are provided in the axial direction of the drive shaft 16.

Needless to say, the total number of the electromagnetic valves is not limited to 8.

This invention may be embodied in several forms without departing from the spirit of essential characteristics thereof. The present embodiments as described are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A hydraulic actuator used in a hydraulically operable system, said hydraulic actuator comprising:

a housing;

a motor installed on a first surface of said housing and having a drive shaft normal to said first surface;

at least one pump installed in said housing and driven by said motor for introducing and discharging operation fluid;

two reservoirs provided in said housing for storing the operation fluid released from a hydraulically operable element and supplied to said pump, each reservoir being defined at least in part by a reservoir cavity within the housing and having an opening at a second surface of said housing and an axis normal to said second surface, said second surface being different from said first surface; and two dampers provided in said housing for suppressing pulsation flow of said operation fluid discharged from said pump, each damper being defined at least in part by a damper cavity within the housing having an opening at a third surface of said housing and an axis normal to said third surface, said third surface being different from said second surface, said damper cavity being separated from said reservoir cavity;

wherein said third surface is spaced from and facing to said second surface so that said drive shaft of said motor is interposed between said two reservoirs and said two dampers.

2. The hydraulic actuator in accordance with claim 1, wherein one of said two reservoirs is overlapped with one of said two dampers and the other of said two reservoirs is overlapped with the other of said two dampers when said two reservoirs and said two dampers are seen from a direction normal to said second surface.

3. The hydraulic actuator in accordance with claim 2, wherein a distance between axes of said reservoir and said damper which are overlapped each other is shorter than a smaller one of a reservoir diameter and a damper diameter.

4. The hydraulic actuator in accordance with claim 3, wherein the axis of the reservoir coincides with the axis of said damper when said reservoir and said damper are overlapped each other in the direction normal to said second surface.

5. The hydraulic actuator in accordance with claim 1, wherein a plurality of control valves are provided at a fourth surface of said housing for controlling the flow of said operation fluid, and said fourth surface faces to said first surface on which said motor is disposed.

6. The hydraulic actuator in accordance with claim 5, wherein said plurality of control valves are a total of eight control valves arranged in a 2×4 pattern along two lines parallel to said third surface, and all of said eight control valves are located at the same side adjacent to said dampers with respect to said drive shaft.

7. A hydraulic actuator used in a hydraulically operable system, said hydraulic actuator comprising:

a hexahedral housing;

a motor installed on a first surface of said housing and having a drive shaft normal to said first surface;

at least one pump installed in said housing and driven by said motor for introducing and discharging operation fluid;

two reservoirs provided in said housing for storing the operation fluid released from a hydraulically operable element and supplied to said pump, each reservoir being defined at least in part by a reservoir cavity within the housing and having an opening at a second surface of said housing and an axis normal to said second surface, said second surface being located next to said first surface; and two dampers provided in said housing for suppressing pulsation flow of the operation fluid discharged from said pump, each damper being defined at least in part by a damper cavity within the housing having an opening at a third surface of said housing and an axis normal to said third surface, said third surface being in an opposed relationship with said second surface, said damper cavity being separated from said reservoir cavity so that said drive shaft of said motor is interposed between said two reservoirs and said two dampers.

8. The hydraulic actuator in accordance with claim 7, wherein one of said two reservoirs is overlapped with one of said two dampers and the other of said two reservoirs is overlapped with the other of said two dampers when said two reservoirs and said two dampers are seen from a direction normal to said second surface.

9. The hydraulic actuator in accordance with claim 8, wherein a distance between axes of said reservoir and said damper which are overlapped each other is shorter than a smaller one of a reservoir diameter and a damper diameter.

10. The hydraulic actuator in accordance with claim 9, wherein the axis of the reservoir coincides with the axis of said damper when said reservoir and said damper are overlapped each other in the direction normal to said second surface.

11. The hydraulic actuator in accordance with claim 7, wherein a plurality of control valves are provided at a fourth surface of said housing for controlling the flow of said operation fluid, and said fourth surface faces to said first surface on which said motor is disposed.

12. The hydraulic actuator in accordance with claim 11, wherein said plurality of control valves are a total of eight control valves arranged in a 2×4 pattern along two lines parallel to said third surface, and all of said eight control valves are located at the same side adjacent to said dampers with respect to said drive shaft.

13. A hydraulic actuator used in a hydraulically operable system, said hydraulic actuator comprising:

a housing;

a motor installed on a first surface of said housing and having a drive shaft normal to said first surface;

at least one pump installed in said housing and driven by said motor for introducing and discharging operation fluid;

two reservoirs provided in said housing for storing the operation fluid released from a hydraulically operable element and supplied to said pump, each reservoir being defined at least in part by a reservoir cavity serving as a cylindrical reservoir chamber recessed from a second surface of said housing with an axis normal to said second surface; and two dampers provided in said housing for suppressing pulsation flow of said operation fluid, each damper being defined at least in part by a damper cavity serving as a cylindrical damper chamber recessed from a third surface of said housing with an axis normal to said third surface, said damper cavity being separated from said reservoir cavity so that said drive shaft of said motor is interposed between said two reservoirs and said two dampers;

wherein said second surface is different from said third surface and said second surface is parallel to said third surface.

14. The hydraulic actuator in accordance with claim 13, wherein one of said two reservoirs is overlapped with one of said two dampers and the other of said two reservoirs is overlapped with the other of said two dampers when said two reservoirs and said two dampers are seen from a direction normal to said second surface.

15. The hydraulic actuator in accordance with claim 14, wherein a distance between axes of said reservoir and said damper which are overlapped each other is shorter than a smaller one of a reservoir diameter and a damper diameter.

16. The hydraulic actuator in accordance with claim 15, wherein the axis of the reservoir coincides with the axis of said damper when said reservoir and said damper are overlapped each other in the direction normal to said second surface.

17. The hydraulic actuator in accordance with claim 13, wherein a plurality of control valves are provided at a fourth surface of said housing for controlling the flow of said operation fluid, and said fourth surface faces to said first surface on which said motor is disposed.

18. The hydraulic actuator in accordance with claim 17, wherein said plurality of control valves are a total of eight control valves arranged in a 2×4 pattern along two lines parallel to said third surface, and all of said eight control valves are located at the same side adjacent to said dampers with respect to said drive shaft.

19. A hydraulic actuator used in a hydraulically operable system, said hydraulic actuator comprising:

a housing;

a motor installed on a first surface of said housing and having a drive shaft normal to said first surface;

at least one pump installed in said housing and driven by said motor for introducing and discharging operation fluid;

two reservoirs provided in said housing for storing the operation fluid released from a hydraulically operable element and supplied to said pump, each reservoir being defined at least in part by a reservoir cavity having an opening at a second surface of said housing and an axis normal to said second surface, said second surface being different from said first surface;

two dampers provided in said housing for suppressing pulsation flow of the operation fluid discharged from said pump, each damper being defined at least in part by a damper cavity having an opening at a third surface of said housing and an axis normal to said third surface, said third surface being different from said second surface, said damper cavity being separated from said reservoir cavity; and a plurality of control valves provided at a fourth surface of said housing for controlling the flow of said operation fluid, said fourth surface facing to said first surface on which said motor is disposed;

wherein said third surface faces to said second surface so that said drive shaft of said motor is interposed between said two reservoirs and said two dampers; and said plurality of control valves is located at the same side adjacent to said dampers with respect to said drive shaft and said pump.

20. The hydraulic actuator in accordance with claim 19, wherein an axial length of said damper cavity is longer than an axial length of said reservoir cavity.

21. A hydraulic actuator used in a hydraulically operable system, said hydraulic actuator comprising:

a hexahedral housing;

a motor installed on a surface of said housing for driving at least one piston pump, said piston pump reciprocating to perform a predetermined pumping operation;

two reservoirs provided in said housing for storing operation fluid released from a hydraulically operable element and supplied to said piston pump, each reservoir being defined at least in part by a reservoir cavity within the housing extending in a direction normal to said piston pump;

two dampers provided in said housing for suppressing pulsation flow of said operation fluid discharged from said piston pump, each damper being defined at least in part by a damper cavity separated from said reservoir cavity and provided in an opposed relationship with said reservoir cavity with respect to said piston pump so that said dampers and said reservoirs are recessed within and on opposite sides of said housing; and a plurality of electromagnetic valves provided in said housing for controlling the flow of said operation fluid, said electromagnetic valves being disposed in valve cavities recessed from a surface of said housing opposed to said surface on which said motor is installed; said electromagnetic valves being located at the same side adjacent to said damper cavities with respect to said piston pump, with at least part of said electromagnetic valves being overlapped with said damper cavities when said electromagnetic valves and said dampers are seen from the axial direction of said electromagnetic valves.

22. A hydraulic actuator used in a hydraulically operable system, said hydraulic actuator comprising:

a hexahedral housing;

a motor installed on a surface of said housing for driving at least one piston pump, said piston pump reciprocating to perform a predetermined pumping operation;

two reservoirs provided in said housing for storing operation fluid released from a hydraulically operable element and supplied to said piston pump, each reservoir being defined at least in part by a reservoir cavity within the housing extending in a direction normal to said piston pump;

two dampers provided in said housing for suppressing pulsation flow of said operation fluid discharged from said piston pump, each damper being defined at least in part by a damper cavity separated from said reservoir cavity and provided in an opposed relationship with said reservoir cavity with respect to said piston pump so that said dampers and said reservoirs are recessed within and on opposite sides of said housing; and a plurality of electromagnetic valves provided in said housing for controlling the flow of said operation fluid, said electromagnetic valves being disposed in valve cavities recessed from a surface of said housing opposed to said surface on which said motor is installed; said electromagnetic valves being located at the same side adjacent to said damper cavities with respect to said piston pump, with at least part of said electromagnetic valves being overlapped with said damper cavities when said electromagnetic valves and said dampers are seen from the axial direction of said electromagnetic valves;

wherein said damper cavities are smaller in diameter than said reservoir cavities.

23. The hydraulic actuator in accordance with claim 22, wherein part of a pipe line extending from said electromagnetic valves is interposed between said damper holes and said valve holes of said electromagnetic valves.

24. A hydraulic actuator used in a hydraulically operable system, said hydraulic actuator comprising:

a hexahedral housing;

a motor installed on a surface of said housing for driving at least one piston pump, said piston pump reciprocating to perform a predetermined pumping operation;

two reservoirs provided in said housing for storing operation fluid released from a hydraulically operable element and supplied to said piston pump, each reservoir being defined at least in part by a reservoir cavity within the housing extending in a direction normal to said piston pump;

two dampers provided in said housing for suppressing pulsation flow of said operation fluid discharged from said piston punp, each damper being defined at least in part by a damper cavity separated from said reservoir cavity and provided in an opposed relationship with said reservoir cavity with respect to said piston pump so that said dampers and said reservoirs are recessed within and on opposite sides of said housing; and a plurality of electromagnetic valves provided in said housing for controlling the flow of said operation fluid, said electromagnetic valves being disposed in valve cavities recessed from a surface of said housing opposed to said surface on which said motor is installed; said electromagnetic valves being located at the same side adjacent to said damper cavities with respect to said piston pump, with at least part of said electromagnetic valves being overlapped with said damper cavities when said electromagnetic valves and said dampers are seen from the axial direction of said electromagnetic valves;

wherein said piston pump extends in a direction parallel to said surface on which said motor is disposed and normal to axes of said reservoir cavities and said damper cavities.

25. A hydraulic actuator used in a hydraulically operable system, said hydraulic actuator comprising:

a hexahedral housing;

a motor installed on said housing and having a drive shaft for driving at least one piston pump, said piston pump reciprocating to perform a predetermined pumping operation;

two reservoirs provided in said housing for storing operation fluid released from a hydraulically operable element and supplied to said piston pump, said reservoirs being defined at least in part by reservoir cavities provided at the same side with respect to a reference plane defined by a shifting direction of said piston pump and said drive shaft;

two dampers provided in said housing for suppressing pulsation flow of the operation fluid discharged from said piston motor, said dampers being defined at least in part by damper cavities separated from said reservoir cavities and provided at the other side with respect to said reference plane defined by said shifting direction of said piston pump and said drive shaft so that said dampers and said reservoirs are recessed within and on opposite sides of said housing; and a plurality of electromagnetic valves provided in said housing for controlling the flow of said operation fluid, said electromagnetic valves being disposed in valve holes provided at the same side as said dampers with respect to said reference plane defined by said shifting direction of said piston pump and said drive shaft.

26. The hydraulic actuator in accordance with claim 24, wherein part of a pipe line extending from said electromagnetic valves is interposed between said damper cavities and said valve cavities of said electromagnetic valves.

* * * * *